US010654404B2

(12) United States Patent
Kosugi et al.

(10) Patent No.: US 10,654,404 B2
(45) Date of Patent: May 19, 2020

(54) VEHICLE LIGHTING DEVICE INCLUDING CIRCUIT PORTIONS HAVING AT LEAST ONE LIGHT EMITTING DIODE, AND CONTROL PORTION THAT CONTROLS CONNECTION STATE OF CIRCUIT PORTIONS

(71) Applicant: Toshiba Lighting & Technology Corporation, Yokosuka-shi, Kanagawa-ken (JP)

(72) Inventors: Daisuke Kosugi, Yokosuka (JP); Atsushi Heike, Yokosuka (JP)

(73) Assignee: Toshiba Lighting & Technology Corporation, Yokosuka-shi, Kanagawa-ken (JP)

( * ) Notice: Subject to any disclaimer, the term of this patent is extended or adjusted under 35 U.S.C. 154(b) by 0 days.

(21) Appl. No.: 15/454,037

(22) Filed: Mar. 9, 2017

(65) Prior Publication Data

US 2018/0029527 A1 Feb. 1, 2018

(30) Foreign Application Priority Data

Jul. 27, 2016 (JP) .................................. 2016-147673

(51) Int. Cl.
*H05B 45/50* (2020.01)
*B60Q 1/26* (2006.01)
*H05B 45/44* (2020.01)

(52) U.S. Cl.
CPC ............... *B60Q 1/26* (2013.01); *H05B 45/44* (2020.01); *H05B 45/50* (2020.01)

(58) Field of Classification Search
CPC ....................... H05B 33/0869; H05B 33/0872; H05B 37/02; H05B 37/0227; H05B 33/0857;
(Continued)

(56) References Cited

U.S. PATENT DOCUMENTS 7,994,725 B2 * 8/2011 Bouchard .............. H05B 45/48
315/122
8,354,799 B2 * 1/2013 Yang ...................... H05B 45/50
315/247

(Continued)

FOREIGN PATENT DOCUMENTS

CN         206459131 U    9/2017
DE    10 2006 024607 A1   11/2007
(Continued)

OTHER PUBLICATIONS

Oct. 18, 2017—(EP) Extended Search Report—App 17159981.4.
(Continued)

*Primary Examiner* — Tung X Le
*Assistant Examiner* — Borna Alaeddini
(74) *Attorney, Agent, or Firm* — Banner & Witcoff, Ltd.

(57) ABSTRACT

A vehicle lighting device includes a plurality of circuit portions that have at least one light emitting element; and a control portion that is electrically connected to the plurality of circuit portions. The control portion detects an input voltage and connects the plurality of circuit portions in series when the detected input voltage exceeds a predetermined value and connects at least a part of the plurality of circuit portions in parallel when the detected input voltage is equal to or less than the predetermined value.

14 Claims, 7 Drawing Sheets

(58) Field of Classification Search
CPC .......... H05B 33/0863; H05B 33/0866; H05B 37/0245; H05B 33/02; H05B 33/0803; H05B 33/086; H05B 45/44; H05B 45/46; H05B 45/48; H05B 45/50; H05B 45/395; B60Q 1/26

See application file for complete search history.

(56) References Cited

U.S. PATENT DOCUMENTS

| | | | |
|---|---|---|---|
| 8,456,095 B2* | 6/2013 | Huynh | H05B 45/48 |
| | | | 315/209 R |
| 8,816,591 B2* | 8/2014 | Chu | H05B 45/44 |
| | | | 315/193 |
| 8,963,431 B2* | 2/2015 | van den Berg | H05B 45/37 |
| | | | 315/122 |
| 9,277,605 B2* | 3/2016 | Ni | H05B 45/37 |
| 9,320,099 B2* | 4/2016 | Leung | H05B 45/48 |
| 9,420,644 B1* | 8/2016 | Shum | H05B 33/089 |
| 9,468,058 B2* | 10/2016 | Kang | H05B 45/48 |
| 9,586,520 B2 | 3/2017 | Yamaguchi | |
| 9,769,891 B2* | 9/2017 | Baccarin | H05B 33/0824 |
| 2011/0095706 A1 | 4/2011 | Vilmi | |
| 2011/0148301 A1 | 6/2011 | Schnerr et al. | |
| 2012/0098430 A1* | 4/2012 | Inoue | H05B 45/58 |
| | | | 315/82 |
| 2012/0139448 A1 | 6/2012 | Chiang et al. | |
| 2013/0175924 A1* | 7/2013 | Codutti | H05B 45/50 |
| | | | 315/77 |
| 2014/0015665 A1 | 1/2014 | Yamaguchi | |
| 2014/0062314 A1 | 3/2014 | Moskowitz | |
| 2014/0184079 A1* | 7/2014 | Marchesin | H05B 45/37 |
| | | | 315/122 |
| 2014/0270793 A1* | 9/2014 | Bradford | H05B 45/37 |
| | | | 398/118 |
| 2015/0230298 A1 | 8/2015 | Chu et al. | |
| 2015/0305098 A1* | 10/2015 | Jung | H05B 45/44 |
| | | | 315/122 |
| 2016/0121783 A1 | 5/2016 | Takagimoto et al. | |
| 2016/0262231 A1* | 9/2016 | Iellina | H05B 45/46 |
| 2017/0009953 A1 | 1/2017 | Kosugi et al. | |
| 2018/0029527 A1 | 2/2018 | Kosugi et al. | |
| 2018/0248354 A1* | 8/2018 | Sugisawa | H02H 3/087 |

FOREIGN PATENT DOCUMENTS

| | | |
|---|---|---|
| EP | 2 685 789 A1 | 1/2014 |
| EP | 3118059 A1 | 1/2017 |
| JP | 2011-526056 A | 9/2011 |
| JP | 2014-019171 A | 2/2014 |
| JP | 2015-063252 A | 4/2015 |
| WO | 2009/156590 A1 | 12/2009 |

OTHER PUBLICATIONS

Jun. 14, 2018—U.S. Non-Final Office Action—U.S. Appl. No. 15/903,359.

Aug. 2, 2018—(EP) Extended EP Search Report—App 18158157.0.

Dec. 11, 2018—U.S. Notice of Allowance—U.S. Appl. No. 15/903,359.

* cited by examiner

VEHICLE LIGHTING DEVICE INCLUDING CIRCUIT PORTIONS HAVING AT LEAST ONE LIGHT EMITTING DIODE, AND CONTROL PORTION THAT CONTROLS CONNECTION STATE OF CIRCUIT PORTIONS

CROSS-REFERENCE TO RELATED APPLICATIONS

This application is based upon and claims the benefit of priority from Japanese Patent Application No. 2016-147673, filed on Jul. 27, 2016; the entire contents of which are incorporated herein by reference.

FIELD

Embodiments described herein relate generally to a vehicle lighting device and a vehicle lamp.

BACKGROUND

There is a vehicle lighting device including a plurality of light emitting diodes (LEDs) which are connected in series.

Here, a voltage applied to the vehicle lighting device fluctuates. Therefore, in the vehicle lighting device, an operating voltage range (voltage fluctuation range) is determined.

In addition, the light emitting diode has a forward voltage drop. Therefore, when the voltage applied to the plurality of light emitting diodes connected in series decreases, an amount of light emitted from the plurality of light emitting diodes decreases and there is a concern that a total luminous flux of the vehicle lighting device becomes less than a specified value.

Therefore, a technique is proposed in which when the voltage applied to the vehicle lighting device decreases, a current does not flow through some light emitting diodes among the plurality of light emitting diodes which are connected in series.

Thus, even when the voltage applied to the vehicle lighting device decreases, it is possible to secure a required total luminous flux.

However, when the current does not flow through some light emitting diodes, there is a new problem that the current flowing through remaining light emitting diodes suddenly increases and the total luminous flux rapidly increases.

Therefore, it is desired to develop a technique in which even when the voltage applied to the vehicle lighting device decreases, it is possible to secure a required total luminous flux and to suppress fluctuation of a total luminous flux.

DETAILED DESCRIPTION

In general, according to one embodiment, a vehicle lighting device includes a plurality of circuit portions that have at least one light emitting element; and a control portion that is electrically connected to the plurality of circuit portions.

The control portion detects an input voltage, connects the plurality of circuit portions in series when the detected input voltage exceeds a predetermined value, and connects at least a part of the plurality of circuit portions in parallel when the detected input voltage is equal to or less than the predetermined value.

Hereinafter, embodiments will be described with reference to the drawings. Moreover, the same reference numerals are given to the same configuration elements in each drawing and detailed description will be appropriately omitted.

A vehicle lighting device 1 of the embodiment, for example, can be provided in automobiles, railway vehicles, or the like. As the vehicle lighting device 1 provided in the automobile, for example, a front combination light (formed by appropriately combining, for example, a daytime running lamp (DRL), a position lamp, a turn signal lamp, and the like), a rear combination light (formed by appropriately combining, for example, a stop lamp, a tail lamp, a turn signal lamp, a back lamp, a fog lamp, and the like), and the like can be exemplified. However, application of the vehicle lighting device 1 is not limited to the examples.

Figure 1:
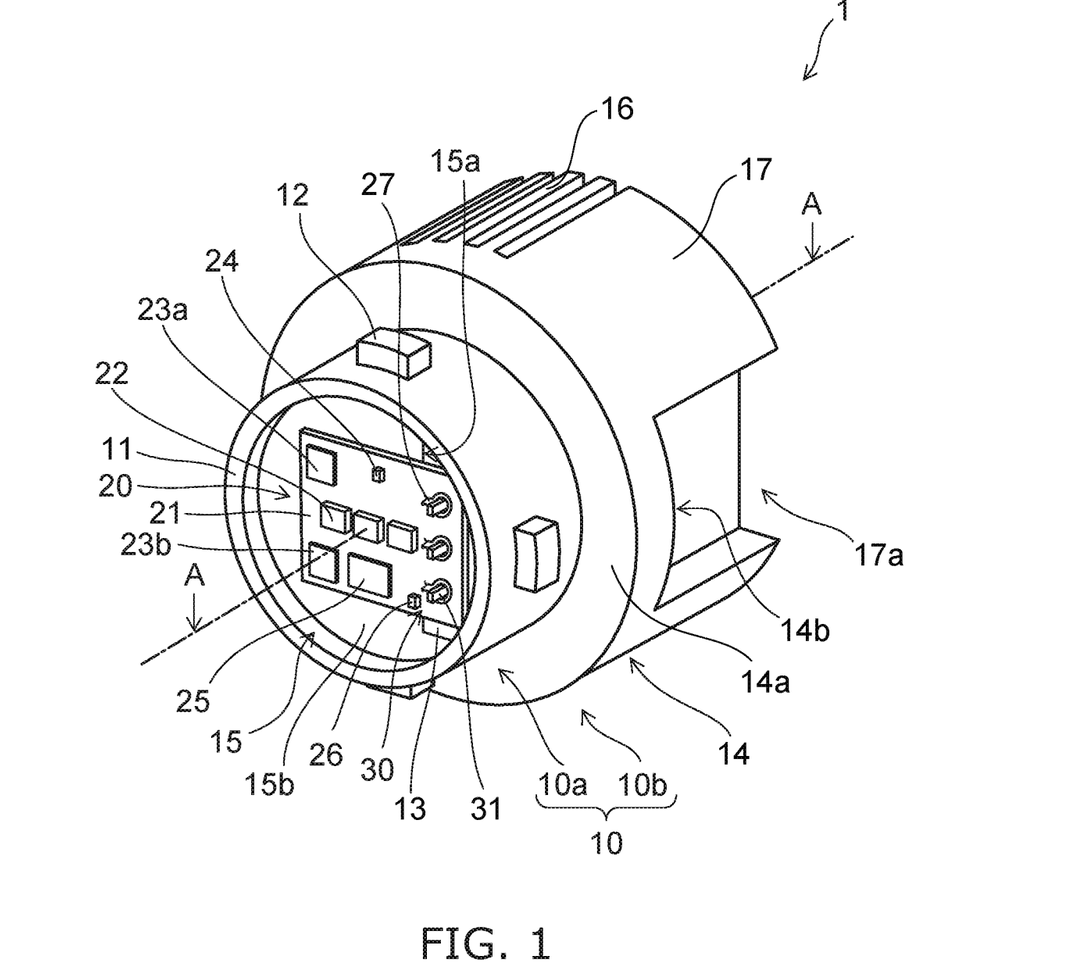
FIG. 1 is a schematic perspective view illustrating a vehicle lighting device according to the embodiment.

FIG. 1 is a schematic perspective view illustrating the vehicle lighting device 1 according to the embodiment.

Figure 2:
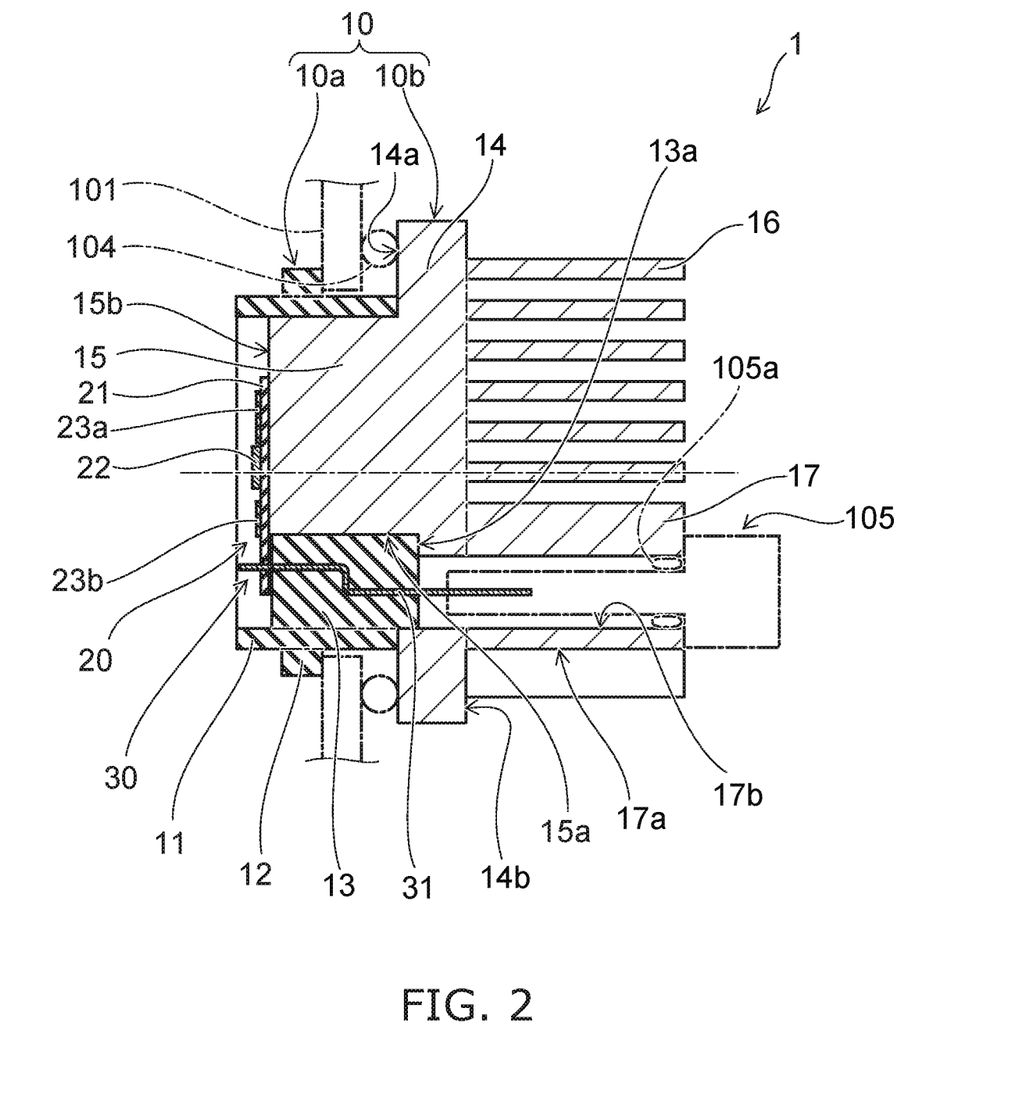
FIG. 2 is a schematic sectional view of the vehicle lighting device viewed in a direction of line A-A in FIG. 1.

FIG. 2 is a schematic sectional view of the vehicle lighting device 1 viewed in a direction of line A-A in FIG. 1.

As illustrated in FIGS. 1 and 2, the vehicle lighting device 1 is provided with a socket 10, a light emitting module 20, and a power supplying portion 30.

The socket 10 has a storage portion 10a and a heat radiating portion 10b.

The storage portion 10a has a mounting portion 11, bayonets 12, and an insulating portion 13.

The mounting portion 11 has a tubular shape. The mounting portion 11 can have, for example, a cylindrical shape. The mounting portion 11 is provided on a side of a flange 14 opposite to a side in which heat radiating fins 16 are provided. The mounting portion 11 surrounds a loading portion 15.

The bayonets 12 are provided on a side surface of the mounting portion 11 and protrude outward from the vehicle lighting device 1. The bayonets 12 face the flange 14. A plurality of bayonets 12 are provided. The bayonets 12 are used when attaching the vehicle lighting device 1 to a vehicle lamp 100 by a twist-lock.

The insulating portion 13 is provided on an inside of the mounting portion 11.

The storage portion 10a can be formed by integrally molding the mounting portion 11, the bayonets 12, and the insulating portion 13, or can be formed by joining them together.

The storage portion 10a has a function of storing the light emitting module 20 and a function of insulating power supply terminals 31. Therefore, it is preferable that the mounting portion 11, the bayonets 12, and the insulating portions 13 are formed of an insulating material. The insulating material can be, for example, an organic material such as resin, an inorganic material such as ceramics (for example, aluminum oxide, aluminum nitride, or the like), or the like.

The heat radiating portion 10b has the flange 14, the loading portion 15, the heat radiating fins 16, and a projection portion 17.

The flange 14 has a plate shape. The flange 14 can have, for example, a disk shape. An outside surface of the flange 14 is positioned on the outside of the vehicle lighting device 1 more than the outside surface of the bayonet 12.

The loading portion 15 can have a columnar shape. The loading portion 15 is provided on a surface 14a of the flange 14 on a side opposite to the side in which the heat radiating fins 16 are provided. A recessed portion 15a is provided on the side surface of the loading portion 15. The insulating portion 13 is provided on the inside of the recessed portion 15a. The light emitting module 20 (substrate 21) is provided on a surface 15b of the loading portion 15 on a side opposite to the flange 14 side.

The heat radiating fins 16 are provided on the surface 14b of the flange 14 on a side opposite to the side in which the loading portion 15 is provided. A plurality of heat radiating fins 16 can be provided. The plurality of heat radiating fins 16 can be provided to parallel to each other. The heat radiating fins 16 can have a plate shape.

The projection portion 17 has a function of protecting an end portion of the power supply terminal 31 and a function of holding a connector 105. The projection portion 17 is provided on a surface 14b of the flange 14 in which the heat radiating fins 16 are provided. The projection portion 17 can have a block shape. A recessed portion 17a is provided on an outside surface of the projection portion 17. A hole 17b is provided in the projection portion 17. The hole 17b penetrates between an end surface of the projection portion 17 on a side opposite to the flange 14 side and the surface 14a of the flange 14 on a side opposite to the side in which the heat radiating fins 16 are provided. The end portion of the power supply terminal 31 protrudes on the flange 14 side of the hole 17b. The connector 105 having a sealing member 105a is inserted into the hole 17b.

The heat radiating portion 10b can be formed by integrally molding the flange 14, the loading portion 15, the heat radiating fins 16, and the projection portion 17 or can be formed by joining these members by individually forming these members.

The heat radiating portion 10b has a function of loading the light emitting module 20 and a function of discharging heat generated in the light emitting module 20 to the outside. Therefore, in consideration of a function of radiating heat, it is preferable that the flange 14, the loading portion 15, the heat radiating fins 16, and the projection portion 17 are formed of a material having high thermal conductivity. The material having high thermal conductivity can be metal such as aluminum and aluminum alloy, ceramics such as aluminum oxide and aluminum nitride, resin having high thermal conductivity, or the like. Resin having high thermal conductivity is obtained, for example, by mixing a filler made of aluminum oxide or carbon having high thermal conductivity to resin such as polyethylene terephthalate (PET) or nylon.

In addition, the heat radiating portion 10b is joined to the storage portion 10a. The storage portion 10a and the heat radiating portion 10b may be fitted into each other, or may be joined using adhesive and the like. The storage portion 10a and the heat radiating portion 10b may be joined by insert molding, or the storage portion 10a and the heat radiating portion 10b may be joined by heat welding.

The light emitting module 20 is provided on the surface 15b of the loading portion 15 on the side opposite to the flange 14 side.

The light emitting module 20 has the substrate 21, a light emitting element 22, a resistor 23a, a resistor 23b, a diode 24, a control portion 25, and a diode 26.

The substrate 21 is provided on the surface 15b of the loading portion 15. The substrate 21 has a plate shape. A wiring pattern 27 is provided on the surface of the substrate 21. A material or a structure of the substrate 21 is not particularly limited. For example, the substrate 21 can be formed of an inorganic material such as ceramics (for example, aluminum oxide, aluminum nitride, and the like), an organic material such as paper phenol and glass epoxy, and the like. In addition, the substrate 21 may be obtained by coating a surface of a metal plate with an insulating material. In addition, the substrate 21 may be a single layer or may be a multi-layer.

The light emitting element 22 is provided on the substrate 21. The light emitting element 22 is electrically connected to the wiring pattern 27 provided on the surface of the substrate 21. The light emitting element 22 can be, for example, a light emitting diode, an organic light emitting diode, a laser diode, and the like.

A form of the light emitting element 22 is not particularly limited.

The light emitting element 22 can be a light emitting element of a surface mounting type such as Plastic Leaded Chip Carrier (PLCC) type. Moreover, the light emitting element 22 illustrated in FIGS. 1 and 2 is the light emitting element of the surface mounting type.

The light emitting element 22 can be, for example, a light emitting element having a lead wire of a shell type and the like.

In addition, the light emitting element 22 can be mounted by Chip On Board (COB). In a case of the light emitting element 22 that is mounted by the COB, it is possible to provide the light emitting element 22 of a chip shape, wiring electrically connecting the light emitting element 22 and the wiring pattern 27, a frame-like member surrounding the light emitting element 22 and the wiring, a sealing portion provided on an inside of the frame-like member, and the like on the substrate 21. In this case, the sealing portion can contain a phosphor. The phosphor can be, for example, a yttrium-aluminum-garnet based phosphor (YAG based phosphor) or the like. Moreover, the type of the phosphor is not limited to the example. The type of the phosphor can be appropriately changed so that a desired luminescent color can be obtained according to the use of the vehicle lighting device 1.

The resistors 23a and 23b are provided on the substrate 21. The resistors 23a and 23b are electrically connected to the wiring pattern 27 provided on the surface of the substrate 21. The resistors 23a and 23b control a current flowing through the light emitting element 22.

Since there are variations in forward voltage characteristics of the light emitting element 22, if an applied voltage between an anode terminal and a ground terminal is constant, variations occur in brightness (luminous flux, luminance, luminous intensity, and illuminance) of the light emitting element 22. Therefore, a value of the current flowing through the light emitting element 22 is made to fall within a predetermined range by the resistors 23a and 23b so that the brightness of the light emitting element 22 falls within a predetermined range. In this case, a value of the current flowing through the light emitting element 22 can be within a predetermined range by changing resistance values of the resistors 23a and 23b.

The resistors 23a and 23b can be, for example, resistors of a surface mounting type, resistors (metal oxide film resistor) having a lead wire, film-like resistors formed using a screen printing method, and the like. Moreover, the resistors 23a and 23b illustrated in FIGS. 1 and 2 are the film-like resistors. The number, sizes, and arrangements of the resistors 23a and 23b are not limited to the examples described above, and can be appropriately changed in accordance with the number and a specification of the light emitting element 22, and the like.

The control portion 25 is provided on the substrate 21. The control portion 25 is electrically connected to the wiring pattern 27 provided on the surface of the substrate 21.

The control portion 25 connects a plurality of circuit portions (for example, a circuit portion 20a that is an example of a first circuit portion and a circuit portion 20b that is an example of a second circuit portion) in series when an input voltage exceeds a predetermined value, and connects at least a part of the plurality of circuit portions in parallel when the input voltage is equal to or less than the predetermined value (see FIGS. 5A to 7).

For example, the control portion 25 detects an input voltage and can switch a connection state (connection in series or connection in parallel) of the plurality of circuit portions based on the detected input voltage.

In addition, the control portion 25 has a switching circuit using a switching element such as a transistor and a connection state of the plurality of circuit portions can be automatically switched according to the input voltage. Moreover, a known technique can be used for the switching circuit. Therefore, in the following description, a case where the control portion 25 detects the input voltage and the connection state of the plurality of circuit portions is switched based on the detected input voltage will be described.

The diode 24 is provided on the substrate 21. The diode 24 is electrically connected to the wiring pattern 27 provided on the surface of the substrate 21.

The diode 24 is provided so that a reverse voltage is not applied to a part of the light emitting elements 22 when the connection of the plurality of circuit portions are switched from the connection in series to the connection in parallel (see FIGS. 5A to 7).

The diode 26 is provided on the substrate 21. The diode 26 is electrically connected to the wiring pattern 27 provided on the surface of the substrate 21. The diode 26 is provided on an input side of the light emitting module 20. The diode 26 is provided so that the reverse voltage is not applied to the light emitting element 22 and pulse noise is not applied to the light emitting element 22 from a reverse direction.

In addition, it is also possible to provide a cover portion for covering the wiring pattern 27, the film-like resistor, and the like. The cover portion can include, for example, a glass material.

Moreover, details of connection of the light emitting element 22, the resistor 23a, the resistor 23b, the diode 24, the control portion 25, and the diode 26 will be described later.

The power supplying portion 30 has a plurality of power supply terminals 31. The plurality of power supply terminals 31 are provided on the inside of the socket 10 (insulating portion 13). One-side end portion of the plurality of power supply terminals 31 protrudes from an end surface of the insulating portion 13 on a side opposite to the flange 14 side and is electrically connected to the wiring pattern 27 provided in the substrate 21. The other end portion of the plurality of power supply terminals 31 protrudes from the end surface 13a of the insulating portion 13 on the flange 14 side. The other end portion of the plurality of power supply terminals 31 is exposed on the inside of the hole 17b. The number and a shape of the power supply terminals 31, and the like are not limited to the examples described above, and can be appropriately changed.

Next, the light emitting module 20 will be further described.

First, light emitting modules 200 and 210 according to a comparison example will be described.

Figure 3A:
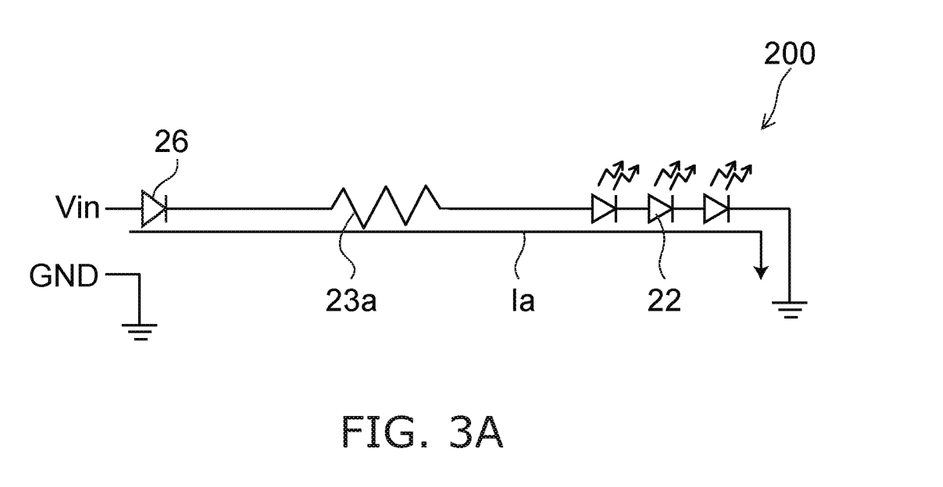
FIG. 3A is a circuit diagram illustrating a light emitting module according to a comparison example.

FIG. 3A is a circuit diagram illustrating the light emitting module 200 according to the comparison example.

Figure 3B:
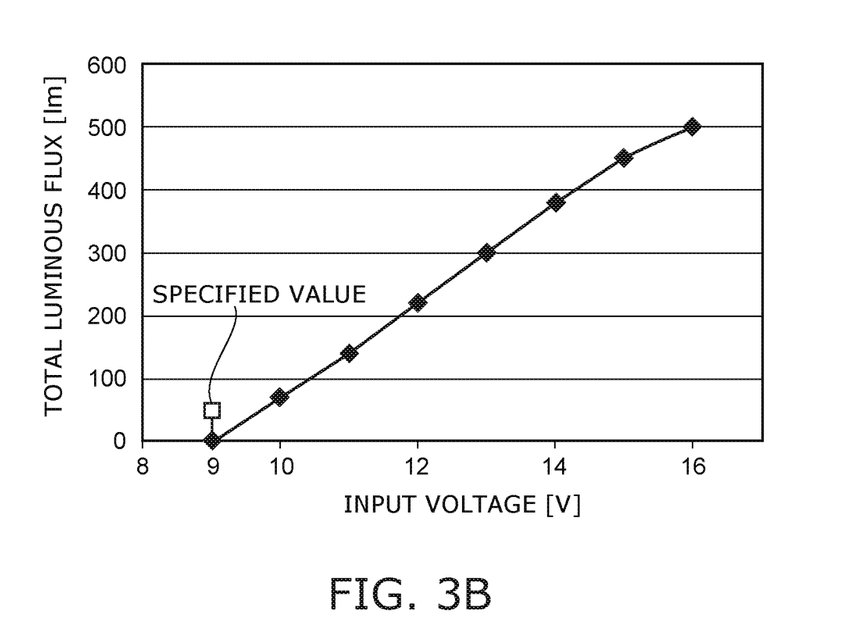
FIG. 3B is a graph illustrating a relationship between an input voltage and a total luminous flux in the light emitting module.

FIG. 3B is a graph illustrating a relationship between an input voltage and a total luminous flux in the light emitting module 200.

As illustrated in FIG. 3A, the light emitting module 200 is provided with light emitting elements 22 and a resistor 23a. Similar to the light emitting module 20 described above, the light emitting elements 22 and the resistor 23a are electrically connected to a wiring pattern 27 provided on a surface of a substrate 21. However, the light emitting module 200 is not provided with the diode 24 and the control portion 25.

Here, in a vehicle lighting device 1, a battery is power supply, but a voltage applied to the vehicle lighting device 1 fluctuates.

For example, an operation standard voltage (rated voltage) of the vehicle lighting device 1 for a general automobile is approximately 13.5 V. However, the voltage applied to the vehicle lighting device 1 fluctuates due to a voltage drop of the battery, an operation of an alternator, an influence of a circuit, and the like.

Therefore, in the vehicle lighting device 1 for an automobile, an operating voltage range (voltage fluctuation range) is determined. For example, the operating voltage range is generally equal to or greater than 9 V and equal to or less than 16 V, and may also be equal to or greater than 7 V and equal to or less than 16 V in some case.

Here, the light emitting element 22 has a forward voltage drop. Therefore, as illustrated in FIG. 3B, when the input voltage (applied voltage) of the plurality of light emitting elements 22 which are connected in series decreases, an amount of light emitted from the plurality of light emitting elements 22 decreases. Therefore, in the vicinity of a lower limit of the operating voltage range, there is a concern that the total luminous flux of the vehicle lighting device 1 is less than a specified value.

For example, when the voltage drop of the light emitting elements 22 in the forward direction is approximately 3 V, if three light emitting elements 22 are connected in series, the voltage drop of 9 V generates. In addition, the resistor 23a is connected in series to the three light emitting elements 22. Therefore, when the input voltage is approximately 9 V, almost no current flows through the three light emitting elements 22 and the total luminous flux of the vehicle lighting device 1 is less than the specified value.

Figure 4A:
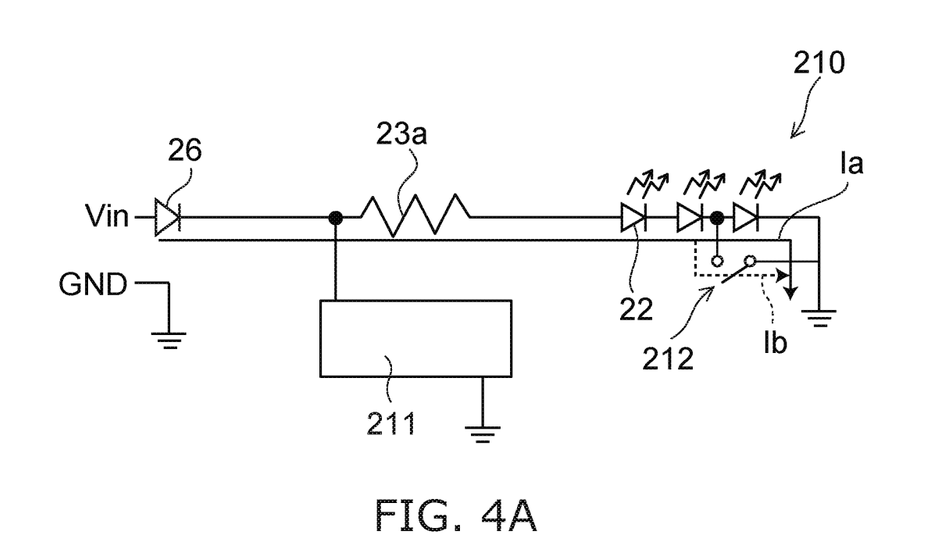
FIG. 4A is a circuit diagram illustrating a light emitting module according to a comparison example.

FIG. 4A is a circuit diagram illustrating a light emitting module 210 according to a comparison example.

Figure 4B:
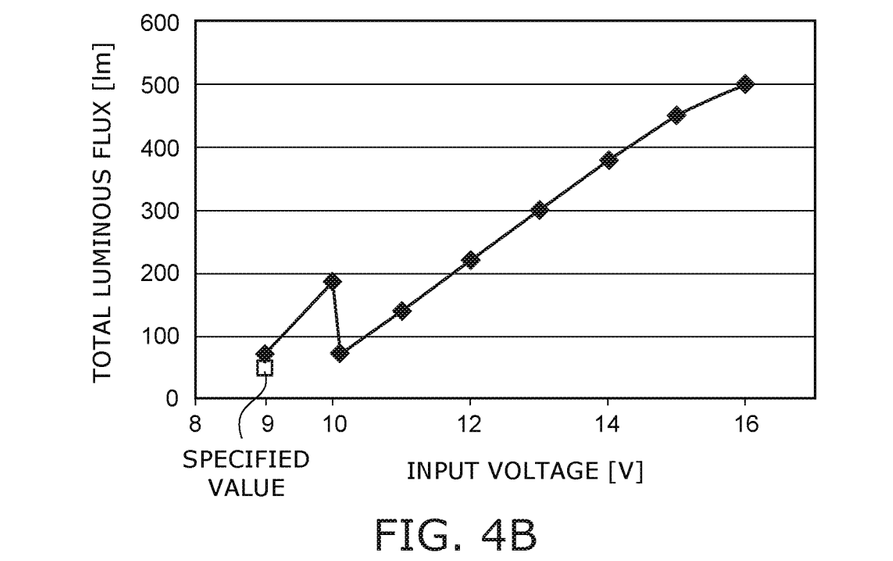
FIG. 4B is a graph illustrating a relationship between an input voltage and a total luminous flux in the light emitting module.

FIG. 4B is a graph illustrating a relationship between an input voltage and a total luminous flux in the light emitting module 210.

As illustrated in FIG. 4A, the light emitting module 210 is provided with the light emitting elements 22, the resistor 23a, a voltmeter 211, and a switch 212.

The voltmeter 211 detects the input voltage. The three light emitting elements 22 are electrically connected in series to the resistor 23a. The switch 212 is connected in parallel to one light emitting element 22 farthest from the inside side.

When the input voltage detected by the voltmeter 211 exceeds a predetermined value, the switch 212 is opened. Then, a current Ia flows through the three light emitting elements 22 connected in series to each other and light is emitted from the three light emitting elements 22.

On the other hand, when the input voltage detected by the voltmeter 211 reaches equal to or less than the predetermined value, the switch 212 is closed. Then, a current Ib flows through the two light emitting elements 22 connected in series to each other and almost no current flows through the light emitting elements 22 connected in parallel to the switch 212. Therefore, the current flowing through two light emitting elements 22 can be increased. As a result, it is possible to prevent the total luminous flux of the vehicle lighting device 1 from being less than the specified value in the vicinity of a lower limit of operating voltage range.

However, if the switch 212 is closed, the current flowing through the two light emitting elements 22 is rapidly increased. Therefore, as illustrated in FIG. 4B, a new problem that the total luminous flux of the vehicle lighting device 1 is rapidly increased in the vicinity of the lower limit of the operating voltage range occurs.

Figure 5A:
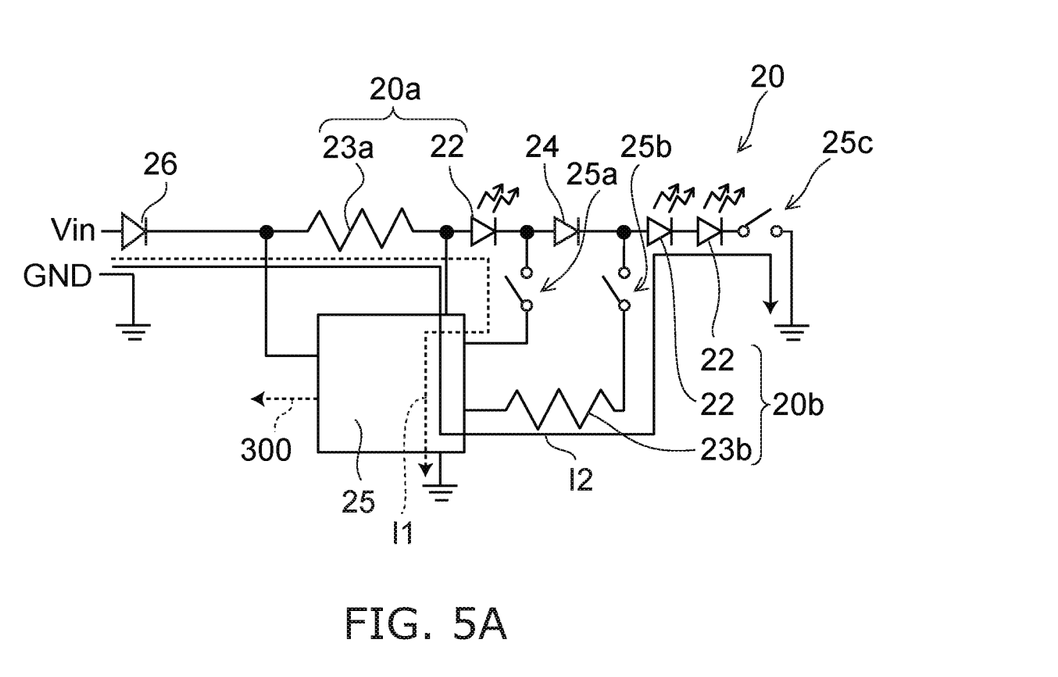
FIG. 5A is a circuit diagram illustrating a light emitting module according to an embodiment.

FIG. 5A is a circuit diagram illustrating a light emitting module 20 according to an embodiment.

Figure 5B:
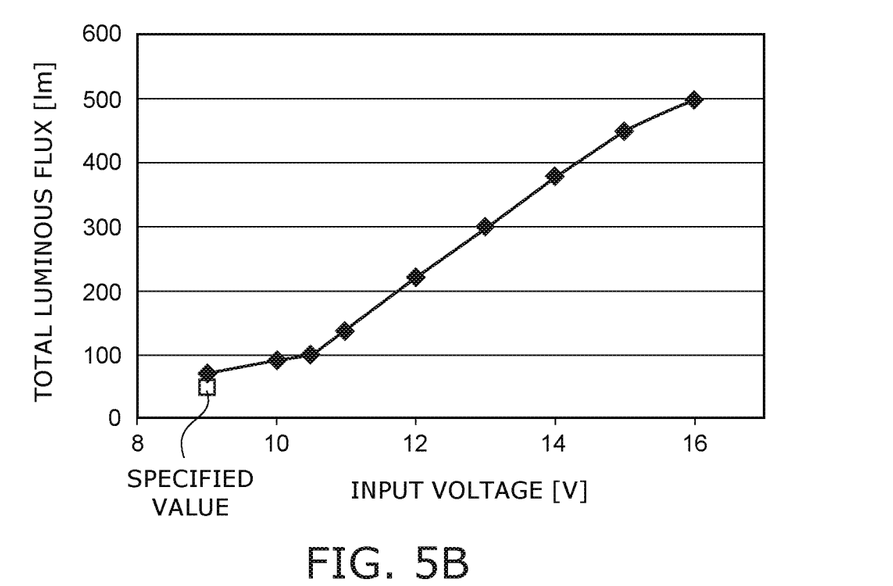
FIG. 5B is a graph illustrating a relationship between an input voltage and a total luminous flux in the light emitting module.

FIG. 5B is a graph illustrating a relationship between an input voltage and a total luminous flux in the light emitting module 20.

As illustrated in FIG. 5A, the light emitting module 20 has the circuit portion 20a, the circuit portion 20b, the diode 24, the control portion 25, and the diode 26.

The circuit portion 20a has at least one light emitting element 22. Moreover, the circuit portion 20a illustrated in FIG. 5A may have one light emitting element 22. In addition, the circuit portion 20a can further include the resistor 23a connected to the light emitting element 22 in series. Moreover, when a plurality of light emitting elements 22 are provided in the circuit portion 20a, the plurality of light emitting elements 22, which are connected in series, and the resistor 23a are connected in series.

The circuit portion 20b has at least one light emitting element 22. Moreover, the circuit portion 20b illustrated in FIG. 5A may have two light emitting elements 22. In addition, the circuit portion 20b can further include the resistor 23b connected to the light emitting element 22 in series. When the plurality of light emitting elements 22 are provided in the circuit portion 20b, the plurality of light emitting elements 22, which are connected in series, and the resistor 23b are connected in series.

The diode 24 is provided between the circuit portion 20a and the circuit portion 20b. An anode side of the diode 24 is electrically connected to the circuit portion 20a. A cathode side of the diode 24 is electrically connected to the circuit portion 20b. The diode 24 is provided so that the reverse voltage is not applied to the circuit portion 20a when the circuit portion 20a and the circuit portion 20b are connected in parallel.

The control portion 25 detects the input voltage and connects the circuit portion 20a and the circuit portion 20b in series or connects them in parallel based on the detected input voltage. Therefore, the control portion 25 has a function of detecting the input voltage and a function of switch for switching the connection state of the circuit portion 20a and the circuit portion 20b.

For example, the control portion 25 has an input voltage determination circuit using a Zener diode (constant voltage diode), a comparator using an operational amplifier, or the like, and can detect the input voltage.

For example, the control portion 25 has switches 25a to 25c that are switching elements (for example, transistors and the like), and can switch the connection state of the circuit portion 20a and the circuit portion 20b.

For example, the control portion 25 includes a central processing unit (CPU), a storage device, and the like, and can perform various controls according to the detected input voltage. Moreover, various controls can be executed according to programs stored in the storage device.

When the detected input voltage exceeds a predetermined value, the control portion 25 causes the circuit portion 20a and the circuit portion 20b to be connected in series. For example, the control portion 25 opens the switches 25a and 25b (for example, the transistor is in an OFF state) and closes the switch 25c (for example, the transistor is in an ON state), thereby connecting the circuit portion 20a and the circuit portion 20b in series. Therefore, all the light emitting elements 22 are connected in series and light is emitted from all the light emitting elements 22.

On the other hand, the control portion 25 causes the circuit portion 20a and the circuit portion 20b to be connected in parallel when the detected input voltage is equal to or less than the predetermined value. For example, the control portion 25 causes the circuit portion 20a and the circuit portion 20b to be connected in parallel by closing the switches 25a to 25c. Therefore, a current I1 flows through the circuit portion 20a and a current I2 flows through the circuit portion 20b. In this case, the current I2 is prevented from flowing through the circuit portion 20a by the diode 24. In this way, it is possible to reduce the number of the light emitting elements 22 which are connected in series. That is, it is possible to reduce the forward voltage drop in the plurality of light emitting elements 22. Therefore, it is possible to suppress that the total luminous flux of the vehicle lighting device 1 is less than the specified value in the vicinity of the lower limit of the operating voltage range.

In this case, if a resistor is provided in the circuit portion 20a, it is possible to control a value of the current I1. Moreover, a resistor may be provided in the circuit portion 20a if necessary. In addition, it is possible to control a value of the current I2 by adjusting a resistance value of the resistor 23b. If the values of the currents I1 and I2 are controlled, a sum of the current I1 and the current I2 can be made equal to the current flowing through the light emitting element 22 when connecting the circuit portion 20a and the circuit portion 20b in series. Therefore, it is possible to prevent the current flowing through the light emitting elements 22 provided in the circuit portion 20a and the circuit portion 20b from being rapidly increased when the connection state of the circuit portion 20a and the circuit portion 20b are changed from the connection in series to the connection in parallel. As a result, it is possible to prevent the total luminous flux from being rapidly increased in the vicinity of the lower limit of operating voltage range.

Moreover, the values of the current I1 and the current I2 can be equal to each other, or can be different from each other.

As described above, according to the vehicle lighting device 1 of the embodiment, as illustrated in FIG. 5B, even when a voltage applied to the vehicle lighting device 1 decreases, it is possible to secure a required total luminous flux and to suppress fluctuation of the total luminous flux.

Moreover, in a film-like resistor, adjustment of the resistance value can be easily adjusted. Therefore, it is preferable that the resistor provided in the circuit portion 20a, or the resistor 23b provided in the circuit portion 20b is the film-like resistor. In this case, the adjustment of the resistance value can be performed as follows. First, the film-like resistor is formed on a surface of a substrate 21 using screen printing or the like. Next, a part of the film-like resistor is removed by irradiating the film-like resistor with laser light. Then, the resistance value of the film-like resistor is changed by a size of a removed portion or the like. In this case, if a part of the film-like resistor is removed, the resistance value increases.

Figure 6:
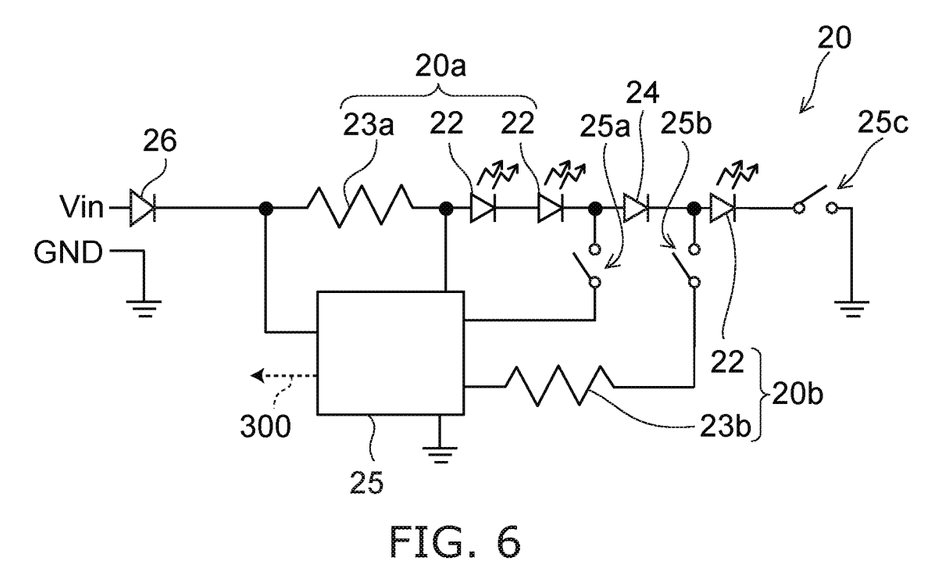
FIG. 6 is a circuit diagram illustrating a light emitting module according to another embodiment.

FIG. 6 is a circuit diagram illustrating a light emitting module 20 according to another embodiment.

As illustrated in FIG. 6, the light emitting module 20 has a circuit portion 20a, a circuit portion 20b, a diode 24, a control portion 25, and a diode 26.

As described above, the circuit portion 20a may have at least one light emitting element 22. For example, in a case of the example illustrated in FIG. 5A, the circuit portion 20a has one light emitting element 22. In a case of the example illustrated in FIG. 6, the circuit portion 20a has two light emitting elements 22 connected in series.

In addition, the circuit portion 20b may have at least one light emitting element 22. For example, in a case of the example illustrated in FIG. 5A, the circuit portion 20b has two light emitting elements 22 connected in series. In a case of the example illustrated in FIG. 6, the circuit portion 20b has one light emitting element 22.

Moreover, the number of the light emitting elements 22 provided in the circuit portion 20a and the circuit portion 20b is not limited to the examples illustrated in FIGS. 5A and 6.

It is possible to enjoy the effects described above even by the embodiment. That is, even when the voltage applied to the vehicle lighting device 1 is lowered, it is possible to secure the required total luminous flux and to suppress fluctuation of the total luminous flux.

Figure 7:
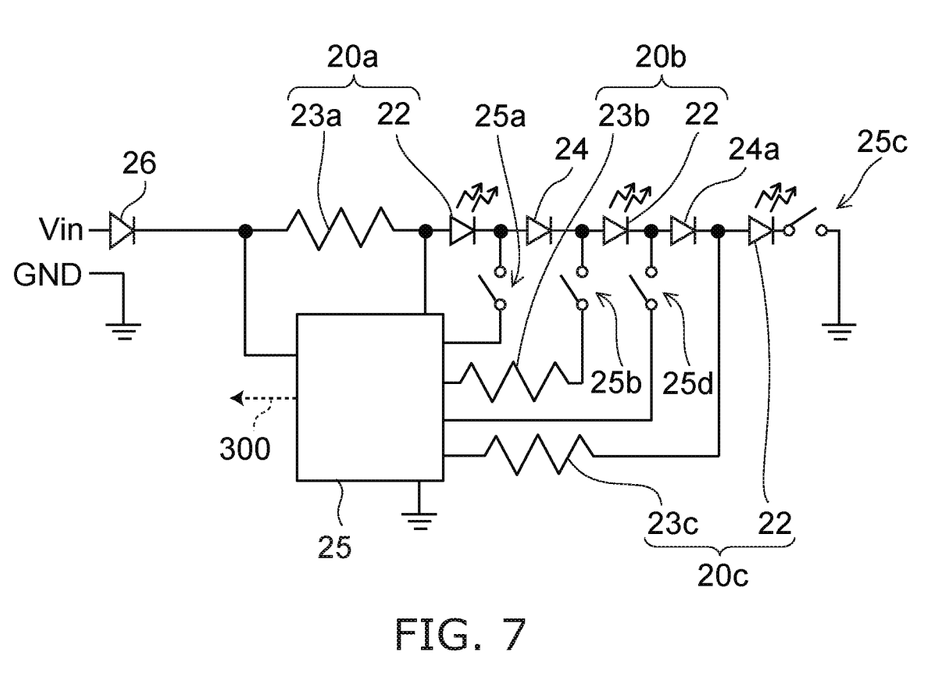
FIG. 7 is a circuit diagram illustrating a light emitting module according to still another embodiment.

FIG. 7 is a circuit diagram illustrating a light emitting module 20 according to still another embodiment.

As illustrated in FIG. 7, the light emitting module 20 has a circuit portion 20a, a circuit portion 20b, a circuit portion 20c, a diode 24, a diode 24a, a control portion 25, and a diode 26. The circuit portion 20c has at least one light emitting element 22. Moreover, the circuit portion 20c illustrated in FIG. 7 has one light emitting element 22. In addition, the circuit portion 20c can further include a resistor 23c connected to the light emitting element 22 in series. Moreover, when a plurality of light emitting elements 22 are provided in the circuit portion 20c, the plurality of light emitting elements 22, which are connected in series, and the resistor 23c are connected in series.

The diode 24a is provided between the circuit portion 20b and the circuit portion 20c. An anode side of the diode 24a is electrically connected to the circuit portion 20b. A cathode side of the diode 24a is electrically connected to the circuit portion 20c. The diode 24a is provided so that a reverse voltage is not applied to the circuit portion 20b when the circuit portion 20b and the circuit portion 20c are connected in parallel.

The control portion 25 detects an input voltage and causes the circuit portion 20a, the circuit portion 20b, and the circuit portion 20c to be connected in series, to be connected in series and in parallel, or to be connected in parallel based on the detected input voltage. For example, the control portion 25 has switches 25a to 25d that are switching elements (for example, transistors or the like) and can switch the connection state of the circuit portion 20a, the circuit portion 20b, and the circuit portion 20c.

In this case, for example, the control portion 25 causes the circuit portion 20a, the circuit portion 20b, and the circuit portion 20c to be connected in series by opening the switches 25a, 25b, and 25d, and closing the switch 25c. For example, the control portion 25 causes the circuit portion 20c to be connected in parallel to the light emitting elements 22 of the circuit portion 20a and the circuit portion 20b that are connected in series by opening the switches 25a and 25b, and closing the switches 25c and 25d. For example, the control portion 25 causes the circuit portion 20a to be connected in parallel to the light emitting element 22 of the circuit portion 20b and the light emitting element 22 of the circuit portion 20c that are connected in series by opening the switch 25d, and closing the switches 25a, 25b, and 25c. For example, the control portion 25 causes the light emitting element 22 of the circuit portion 20a, the light emitting element 22 of the circuit portion 20b, and the light emitting element 22 of the circuit portion 20c to be connected in parallel by closing the switches 25a to 25d. That is, the control portion 25 can appropriately change the number of the circuit portions that are connected in series (or the number of the circuit portions that are connected in parallel), or a combination thereof.

The effect described above can also be enjoyed by the embodiment. That is, even when the voltage applied to the vehicle lighting device 1 decreases, it is possible to secure the required total luminous flux and to suppress fluctuation of the total luminous flux.

As described above, the vehicle lighting device 1 of the embodiment includes a plurality of circuit portions having at least one light emitting element 22 and the control portion 25 that is electrically connected to the plurality of circuit portions. The control portion 25 detects the input voltage and causes the plurality of circuit portions to be connected in series when the detected input voltage exceeds a predetermined value. The control portion 25 causes at least a part of the plurality of circuit portions to be connected in parallel when the detected input voltage is equal to or less than the predetermined value.

In addition, the vehicle lighting device 1 of the embodiment can further include diodes (for example, the diodes 24 and 24a) of which an anode side is electrically connected to an output side of one circuit portion and a cathode side is electrically connected to an input side of the other circuit portion.

Here, if a total sum of forward voltage drops of the plurality of light emitting elements 22 that are connected in series is set to be close to the input voltage, it is possible to improve light emission efficiency and it is possible to reduce power consumption. Therefore, the control portion 25 appropriately changes the number of the circuit portions that are connected in series and the combination thereof based on the detected input voltage so that the number of the light emitting elements connected in series (total sum of voltage drops in the forward direction) can be made appropriate.

Moreover, the number of the circuit portions or the number of the light emitting elements 22 provided in the circuit portions are not limited to the above description and can be appropriately changed according to the use and the size of the vehicle lighting device 1, and the like.

Next, an operation of the control portion 25 will be further described.

Failure may occur in a part of the plurality of light emitting elements 22. For example, open failure may occur in a part of the plurality of light emitting elements 22. When all the light emitting elements 22 are connected in series, if the open failure occurs in a part of the light emitting elements, all the light emitting elements 22 are turned off. Therefore, a driver or a passenger can recognize the failure of the vehicle lighting device 1.

However, as described above, when the voltage applied to the vehicle lighting device 1 is lowered, the circuit portions having the light emitting elements 22 are connected in parallel. Therefore, the circuit portion having the light emitting element 22 in which failure does not occur and the circuit portion having the light emitting element 22 in which failure occurs may be connected in parallel. In this case, light is radiated from the circuit portion having the light emitting element 22 in which failure does not occur. If light is radiated from the circuit portion having the light emitting element 22 in which failure does not occur, the driver or the passenger may not recognize the failure of the vehicle lighting device 1.

Therefore, the control portion 25 can include functions of detecting the current flowing through each of the plurality of circuit portions and determining the presence or absence of the failure of the light emitting element 22. For example, if the open failure occurs in the light emitting element 22, a current does not flow through the circuit portion having the light emitting element 22 in which failure occurs. Therefore, if the current flowing through the circuit portion is detected, it is possible to determine the presence or absence of the failure of the light emitting element 22.

The control portion 25 can turn off all the light emitting elements 22 when it is determined that the open failure occurs in the light emitting element 22. For example, the control portion 25 opens the switches 25*a* to 25*d* described above and can block the current flowing through all the circuit portions.

In addition, the control portion 25 can block the current flowing through the circuit portion having the light emitting element 22 in which the open failure does not occur by controlling the switches 25*a* to 25*d* described above.

In addition, the control portion 25 can also transmit a warning signal 300 to an external device when it is determined that the open failure occurs in the light emitting element 22.

Here, it is considered that the luminous flux of light radiated from the light emitting elements 22 is substantially proportional to the value of the current flowing through the light emitting element 22.

Therefore, the control portion 25 can further include a control circuit (for example, an amplifier circuit, an attenuation circuit, or the like) that changes at least one of the current flowing through the plurality of circuit portions or the voltage applied to the plurality of circuit portions. Moreover, since known technique can be applied to the amplifier circuit and the attenuation circuit, detailed description thereof will be omitted.

For example, when it is determined that open failure occurs in the light emitting element 22, the control portion 25 causes at least one of the current flowing through the circuit portion having the light emitting element 22 in which failure does not occur and the voltage applied to the circuit portion to be increased, and can compensate for a reduced luminous flux due to the occurrence of failure. That is, the control portion 25 causes at least one of the current flowing through the circuit portion having the light emitting element 22 in which failure does not occur and the voltage applied to the circuit portion to be increased, and the total luminous flux can be maintained.

In addition, the control portion 25 causes at least one of the current flowing through the circuit portion having the light emitting element 22 in which failure does not occur and the voltage applied to the circuit portion to be decreased when it is determined that the open failure occurs in the light emitting element 22, and the driver or the passenger can recognize the failure of the vehicle lighting device 1. For example, the control portion 25 causes at least one of the current flowing through the circuit portion having the light emitting element 22 in which failure does not occur and the voltage applied to the circuit portion to be equal to or less than $\frac{1}{10}$ of a predetermined value.

As described above, the control portion 25 detects the current flowing through each of the plurality of circuit portions and determines the presence or absence of failure of the light emitting element 22 based on the detected current.

For example, the control portion 25 blocks the current flowing through the plurality of circuit portions when it is determined that failure occurs in the light emitting element 22.

For example, the control portion 25 blocks the current flowing through the circuit portion having the light emitting element 22 in which failure does not occur when it is determined that failure occurs in the light emitting element 22.

The control portion 25 can further include a control circuit that changes at least one of the current flowing through the plurality of circuit portions and the voltage applied to the plurality of circuit portions. Therefore, the control portion 25 causes at least one of the current flowing through the circuit portion having the light emitting element 22 in which failure does not occur and the voltage applied to the circuit portion to be increased by the control circuit when it is determined that failure occurs in the light emitting element 22.

In addition, the control portion 25 can cause at least one of the current flowing through the circuit portion having the light emitting element 22 in which failure does not occur and the voltage applied to the circuit portion to be decreased by the control circuit when it is determined that failure occurs in the light emitting element 22.

Next, the vehicle lamp 100 is exemplified.

Moreover, hereinafter, as an example, a case of a front combination light in which the vehicle lamp 100 is provided in the automobile will be described. However, the vehicle lamp 100 is not limited to the front combination light provided in the automobile. The vehicle lamp 100 may be a vehicle lamp provided in an automobile, a railway vehicle, and the like.

Figure 8:
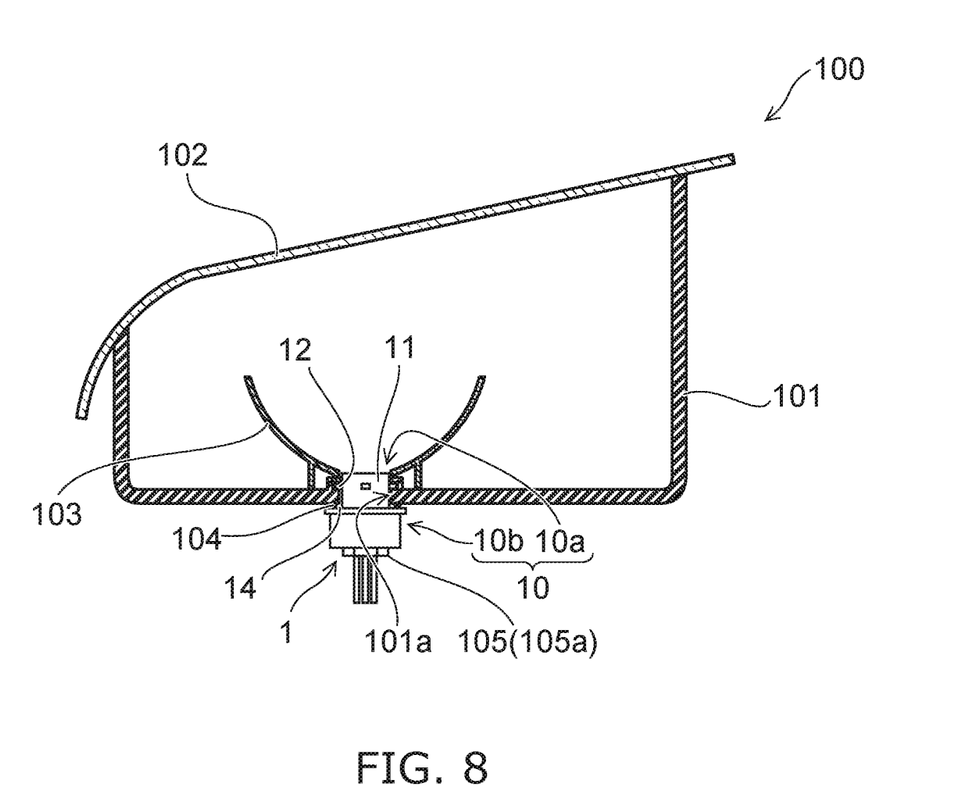
FIG. 8 is a partial sectional view schematically illustrating the vehicle lamp.

FIG. 8 is a partial sectional view schematically illustrating the vehicle lamp 100.

As illustrated in FIG. 8, the vehicle lighting device 1, the housing 101, a cover 102, an optical element portion 103, the sealing member 104, and the connector 105 are provided in the vehicle lamp 100.

The housing 101 has a box shape of which one end portion is opened. The housing 101 can be formed of, for example, resin and the like through which light is not transmitted. An attachment hole 101a into which a portion of the mounting portion 11 in which the bayonets 12 are provided is inserted is provided in a bottom surface of the housing 101. Recessed portions into which the bayonets 12 provided in the mounting portion 11 are inserted are provided in a periphery of the attachment hole 101a. Moreover, a case where the attachment hole 101a is directly provided in the housing 101 is exemplified, but an attaching member having the attachment hole 101a may be provided in the housing 101.

When attaching the vehicle lighting device 1 to the vehicle lamp 100 (housing 101), portions of the mounting portion 11 in which the bayonets 12 are provided are inserted into the attachment holes 101a and the vehicle lighting device 1 is rotated. Then, the bayonets 12 are held by the recessed portions provided on the periphery of the attachment hole 101a. Such an attaching method is called a twist-lock.

When attaching the vehicle lighting device 1 to the vehicle lamp 100, the vehicle lighting device 1 is attached in the direction illustrated in FIG. 1.

That is, the plurality of light emitting elements 22 are provided side by side in a row in the horizontal direction. Therefore, it is possible to obtain the light distribution characteristics for vehicle which are wide in the horizontal direction and are narrow in the vertical direction.

In addition, the plurality of power supply terminals 31 are provided side by side in a row in the vertical direction. The plurality of heat radiating fins 16 are provided side by side in a row in the horizontal direction. The heat radiating fins 16 have the shape extending straightly in the vertical direction. Therefore, the flow of the rising air flow in the region in which the plurality of heat radiating fins 16 are provided can be prevented from being hindered by the projection portion 17, the connector 105, and the heat radiating fins 16.

The cover 102 is provided so as to close an opening of the housing 101. The cover 102 can be formed of resin and the like having a light-transmitting property. The cover 102 can have functions of a lens and the like.

Light emitted from the vehicle lighting device 1 is incident on the optical element portion 103. The optical element portion 103 performs reflection, diffusion, guiding, and condensing of the light emitted from the vehicle lighting device 1, formation of a predetermined light distribution pattern, and the like.

For example, the optical element portion 103 illustrated in FIG. 8 is a reflector. In this case, the optical element portion 103 reflects the light emitted from the vehicle lighting device 1, and causes the predetermined light distribution pattern to be formed. If the optical element portion 103 is the reflector, the optical element portion 103 can be provided on the inside of the housing 101 so as to be coaxial with the center axis of the attachment hole 101a.

The sealing member 104 is provided between the flange 14 and the housing 101. The sealing member 104 can have an annular shape. The sealing member 104 can be formed of a material having elasticity such as rubber or silicone resin.

When attaching the vehicle lighting device 1 to the vehicle lamp 100, the sealing member 104 is interposed between the flange 14 and the housing 101. Thus, an inside space of the housing 101 is sealed by the sealing member 104. In addition, the bayonets 12 are pressed against the housing 101 by elastic force of the sealing member 104.

Thus, the vehicle lighting device 1 can be suppressed to be separated from the housing 101.

The connectors 105 are fitted into end portions of the plurality of power supply terminals 31 exposed on the inside of the hole 17b. Power supply (not illustrated) and the like are electrically connected to the connectors 105. Therefore, power supply (not illustrated) and the like are electrically connected to the light emitting elements 22 by fitting the connectors 105 into the end portions of the power supply terminals 31.

In addition, the connectors 105 have stepped portions. Then, the sealing member 105a is attached to the stepped portions (see FIG. 2). The sealing member 105a is provided to prevent entrance of water on the inside of the hole 17b. When the connector 105 having the sealing member 105a is inserted into the hole 17b, the hole 17b is sealed to be water tightness.

The sealing member 105a can have an annular shape. The sealing member 105a can be formed of a material having elasticity such as rubber or silicone resin. The connector 105 can also be joined, for example, to an element on the socket 10 side using adhesive or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A vehicle lighting device comprising:
each of a plurality of circuit portions having at least one light emitting element; and
a control portion that is electrically connected to the plurality of circuit portions,
the control portion connecting the plurality of circuit portions in series when an input voltage exceeds a predetermined value and connecting at least a part of the plurality of circuit portions in parallel when the input voltage is equal to or less than the predetermined value, the control portion detecting a current flowing through each of the plurality of circuit portions and determining presence or absence of failure of the light emitting element based on the detected current, the control portion determining that failure has occurred in a circuit in which current does not substantially flow,
wherein the control portion blocks the current flowing through a circuit portion having the light emitting element in which failure does not occur when it is determined that at least the part of the plurality of circuit portions are connected in parallel and failure has occurred in the light emitting element provided in at least the part of the plurality of circuit portions.

2. The device according to claim 1, further comprising:
a diode of which an anode side is electrically connected to an output side of a first circuit portion of the plurality of circuit portions and a cathode side is electrically connected to an input side of a second circuit portion of the plurality of circuit portions.

3. The device according to claim 2, wherein the control portion applies a voltage between the second circuit portion and the diode when the first circuit portion and the second circuit portion are connected in parallel.

4. The device according to claim 2, wherein the diode prevents the current flowing through the second circuit portion from flowing through the first circuit portion when the control portion connects the first circuit portion and the second circuit portion in parallel.

5. The device according to claim 2, further comprising:
a first switch that electrically connects a portion between the output side of the first circuit portion and the diode, and the control portion.

6. The device according to claim 2, further comprising:
a second switch that electrically connects a portion between the input side of the second circuit portion and the diode, and the control portion.

7. The device according to claim 2, further comprising:
a third switch that is electrically connected to the output side of the second circuit portion.

8. The device according to claim 2, further comprising:
a first switch that electrically connects a portion between the output side of the first circuit portion and the diode, and the control portion;
a second switch that electrically connects a portion between the input side of the second circuit portion and the diode, and the control portion; and
a third switch that is electrically connected to the output side of the second circuit portion,
wherein the control portion opens the first switch and the second switch, and closes the third switch when the input voltage exceeds a predetermined value.

9. The device according to claim 2, further comprising:
a first switch that electrically connects a portion between the output side of the first circuit portion and the diode, and the control portion;
a second switch that electrically connects a portion between the input side of the second circuit portion and the diode, and the control portion; and
a third switch that is electrically connected to the output side of the second circuit portion,
wherein the control portion closes the first switch, the second switch, and the third switch when the input voltage is equal to or less than a predetermined value.

10. The device according to claim 1, wherein the control portion transmits a signal to an external device when it is determined that failure occurs in the light emitting element.

11. The device according to claim 1, wherein the control portion determines that failure occurs in the light emitting element provided in the circuit portion through which the current does not flow when the circuit portion through which the current does not flow is detected.

12. The device according to claim 1, wherein at least a part of the plurality of circuit portions is provided with a resistor connected to the light emitting element in series.

13. The device according to claim 1, wherein at least a part of the plurality of circuit portions is provided with a plurality of light emitting elements connected in series.

14. A vehicle lamp comprising:
the vehicle lighting device according to claim 1; and
a housing to which the vehicle lighting device is attached.

* * * * *